US011856605B2

(12) United States Patent
Aboul-Magd et al.

(10) Patent No.: US 11,856,605 B2
(45) Date of Patent: *Dec. 26, 2023

(54) MEDIUM ACCESS CONTROL SUPPORT FOR HETEROGENOUS PHYSICAL LAYER DATA UNIT MULTIPLEXING

(71) Applicant: HUAWEI TECHNOLOGIES CO., LTD., Shenzhen (CN)

(72) Inventors: Osama Aboul-Magd, Ottawa (CA); Jung Hoon Suh, Ottawa (CA); Yan Xin, Ottawa (CA); Kwok Shum Au, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 207 days.

This patent is subject to a terminal disclaimer.

(21) Appl. No.: 17/343,391

(22) Filed: Jun. 9, 2021

(65) Prior Publication Data
US 2021/0392686 A1 Dec. 16, 2021

Related U.S. Application Data

(60) Provisional application No. 63/038,527, filed on Jun. 12, 2020.

(51) Int. Cl.
*H04W 74/08* (2009.01)
*H04L 5/00* (2006.01)
(Continued)

(52) U.S. Cl.
CPC ....... *H04W 74/0816* (2013.01); *H04L 5/0098* (2013.01); *H04W 72/0446* (2013.01);
(Continued)

(58) Field of Classification Search
CPC ......... H04W 74/0816; H04W 72/0446; H04W 72/0453; H04L 5/0098
See application file for complete search history.

(56) References Cited

U.S. PATENT DOCUMENTS

2017/0127269 A1 5/2017 Ryu et al.
2017/0311325 A1* 10/2017 Cariou ................. H04B 7/0617
(Continued)

FOREIGN PATENT DOCUMENTS

| CN | 106605382 A | 4/2017 |
| CN | 108702785 A | 10/2018 |
| WO | 2020029604 A1 | 2/2020 |

OTHER PUBLICATIONS

Rui Cao, et. al., "Aggregated PPDU for Large BW", 802.11-2010693r1 May 2020.
(Continued)

*Primary Examiner* — Joseph E Avellino
*Assistant Examiner* — Charles E Eckholdt

(57) ABSTRACT

A first wireless device communicates using a frequency bandwidth with multiple wireless devices, and is configured to concurrently transmit trigger frame messages for each of the multiple wireless devices within respective trigger frame frequency bands of the frequency bandwidth to trigger the multiple wireless devices to concurrently transmit respective data units to the first wireless devices within respective frequency segments of the frequency bandwidth.

11 Claims, 12 Drawing Sheets

(51) Int. Cl.
*H04W 72/0446* (2023.01)
*H04W 72/0453* (2023.01)
*H04W 72/23* (2023.01)
*H04W 74/06* (2009.01)

(52) U.S. Cl.
CPC ....... *H04W 72/0453* (2013.01); *H04L 5/0053* (2013.01); *H04W 72/23* (2023.01); *H04W 74/06* (2013.01)

(56) References Cited

U.S. PATENT DOCUMENTS

2017/0325266 A1* 11/2017 Kim .................. H04W 72/0446
2019/0149280 A1    5/2019 Seok
2021/0377368 A1* 12/2021 Han ........................ H04L 69/08
2022/0201769 A1*  6/2022 Li ...................... H04W 74/0866

OTHER PUBLICATIONS

Xiaogang Chen, "Forward Compatible OFDMA", 802.11-20/0674r1 Mar. 2020.

* cited by examiner

MEDIUM ACCESS CONTROL SUPPORT FOR HETEROGENOUS PHYSICAL LAYER DATA UNIT MULTIPLEXING

REFERENCE TO RELATED APPLICATIONS

This application claims benefit of and priority to U.S. Provisional Patent Application No. 63/038,527, filed Jun. 12, 2020, "MEDIUM ACCESS CONTROL SUPPORT FOR HETEROGENOUS PHYSICAL LAYER DATA UNIT MULTIPLEXING", the contents of which are incorporated herein by reference.

BACKGROUND

A goal of successive generations of radio frequency communications systems is to apply techniques that can increase the amount of information transmitted using communication resources as compared to prior techniques. The Institute of Electrical and Electronics Engineers (IEEE) 802.11 group of standards, which is commonly applied in the context of wireless local area network (WLAN) communication systems, is continually evolving to support higher throughput and includes multiple amendments or generations. However, at any given time the wireless devices communicating using these networks will typically include a mix of devices having a varying range of abilities that correspond to different generations of wireless standards. Some of the wireless devices, for example legacy wireless devices, may not be configured to fully exploit all of the advanced features and resources that are supported in a network that conforms to the most recent generation of a standard.

For example, network configurations have been proposed that will allow up to a 320 MHz basic service set (BSS). When networks that support such a large bandwidth (BW) come online, a number of wireless devices (e.g., wireless devices configured to support an earlier generation standard) will only be able to operate within a subset of the available bandwidth.

Accordingly, there is a need for methods and systems that will enable a wireless network to support heterogeneous communications that enable wireless devices of varying capabilities to collectively take advantage of the large BW.

SUMMARY

According to aspects of the present disclosure, a first wireless device is provided that includes a network interface to communicate using a frequency bandwidth with multiple wireless devices, and at least one processor operatively connected to the network interface and configured to concurrently transmit trigger frame messages, send a control information element that specifies, for each of the multiple wireless devices within respective trigger frame frequency bands of the frequency bandwidth to trigger the multiple wireless devices to concurrently transmit respective data units to the first wireless devices within respective frequency segments of the frequency bandwidth.

According to some examples of the preceding aspect, the frequency bandwidth comprises a primary band, a first secondary band and a second secondary band, each of which correspond to different spectrum regions of the frequency bandwidth, and the concurrent trigger frame messages include a first, second and third trigger frame messages for triggering respective data unit transmissions by respective first second and third devices of the multiple wireless devices within respective first, second and third frequency segments that are respectively within the primary band, first secondary band and second secondary band.

According to some examples of the preceding aspects, the frequency bandwidth has a bandwidth of 320 MHz, the primary band is 80 MHz, the first secondary band is 80 MHz, and the second secondary band is 160 MHz band.

According to some examples of the preceding aspects, the processor is configured to, prior to transmitting the trigger frame messages, transmit a channel announcement message for the multiple wireless devices, the channel announcement indicating the respective trigger frame frequency bands for the respective trigger frame messages.

According to some examples of the preceding aspects, the channel announcement message indicates that the first, second and third trigger frame messages have respective trigger frame frequency bands within the primary band, first secondary band and second secondary band.

According to some examples of the preceding aspects, the channel announcement message indicates that the first, second and third trigger frame messages have respective trigger frame frequency bands are all within the primary band.

According to some examples of the preceding aspects, processor is configured to include an interframe spacing between the parking channel announcement message and the concurrently transmitted trigger frame messages that is of sufficient duration to enable the first, second and third devices to tune to the respective trigger frame frequency bands of the first second and third trigger frame messages.

According to some examples of the preceding aspects the first, second and third trigger frame messages each have a different format conforming to a different generation of a wireless standard.

According to some examples of the preceding aspects the first, second and third trigger frame messages each have an identical format.

According to some examples of the preceding aspects the second and third trigger frame messages each have a same format that is different to a format of the first trigger frame message.

According to some examples of the preceding aspects an inter-frame spacing is specified for inclusion between an end of the concurrently transmitted trigger frame messages and a start of the concurrently transmitted data units that is of sufficient duration to enable the multiple wireless devices to tune to the respective frequency segments of the frequency bandwidth.

According to some examples of the preceding aspects the data units are part of an aggregated physical layer protocol data unit and the frequency bandwidth is within a wireless local area network.

According to a further example aspect is a second wireless device configured to function as one of the multiple wireless devices that communicate with the first wireless device of any one of the preceding aspects.

According to a further example aspect is a method that comprises concurrently transmitting trigger frame messages for multiple wireless devices within respective trigger frame frequency bands of a frequency bandwidth to trigger the multiple wireless devices to concurrently transmit respective data units to the first wireless devices within respective frequency segments of the frequency bandwidth.

BRIEF DESCRIPTION OF THE DRAWINGS

Some implementations of the present disclosure are described with respect to the following figures.

Figure 1:
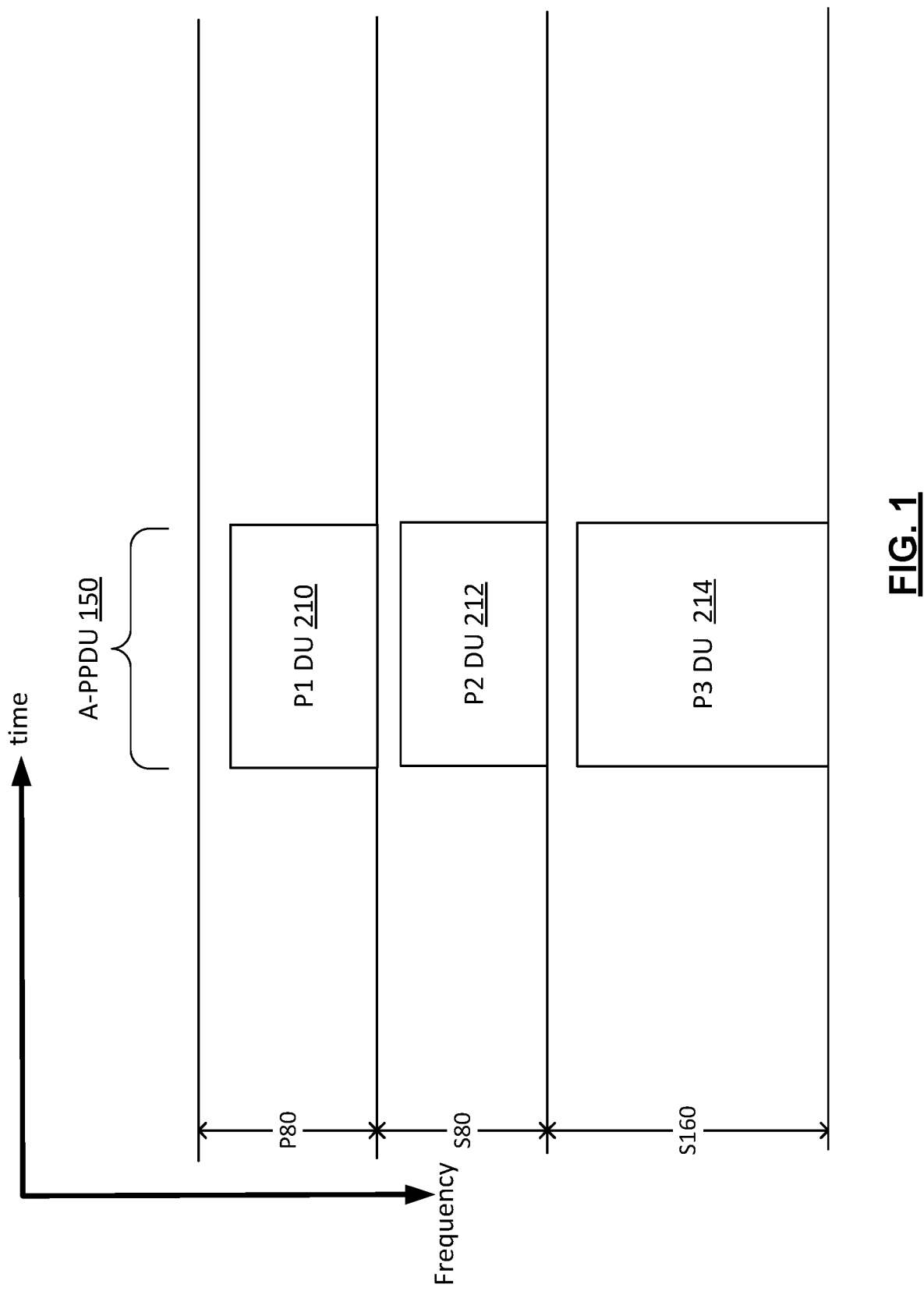
FIG. 1 illustrates an example concurrent data unit transmissions from multiple wireless devices using different frequency segments.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Example embodiments are described in the context of wireless network technology that supports wireless communication among multiple wireless devices using multiple frequency segments within a larger frequency bandwidth (BW). In the case of downlink (DL) communications, a source wireless device can transmit signals using non-overlapping frequency segments to multiple recipient wireless devices. In the case of uplink (UL) communications, a receiving wireless device can receive signals that have been transmitted by multiple transmitting wireless devices using non-overlapping frequency segments. The different frequency segments can carry information that is modulated or coded differently.

For example, an Aggregated Physical Layer (PHY) Protocol Data Unit (A-PPDU) has been proposed as part of the IEEE 802.11 group of protocols to enable multiple wireless devices to concurrently use different frequency segments within a larger frequency BW. In this regard, FIG. 1 illustrates an example of an A-PPDU 150 that includes three respective concurrent data units (DUs) that each occupy a respective non-overlapping frequency segment within a 320 MHz BW. In FIG. 1, a first DU 210 (P1 DU) is within a primary 80 MHz (P80) BW, a second DU 212 (P2DU) is within a secondary 80 MHz (S80) BW and a third DU 214 is within a secondary 160 MHz (S160) BW. In an example embodiment, each of the P1 DU 210, P2 DU 212 and P3 DU 214 are orthogonal in frequency domain symbol-by symbol, and each DU can have the same or different PPDU format.

Figure 2:
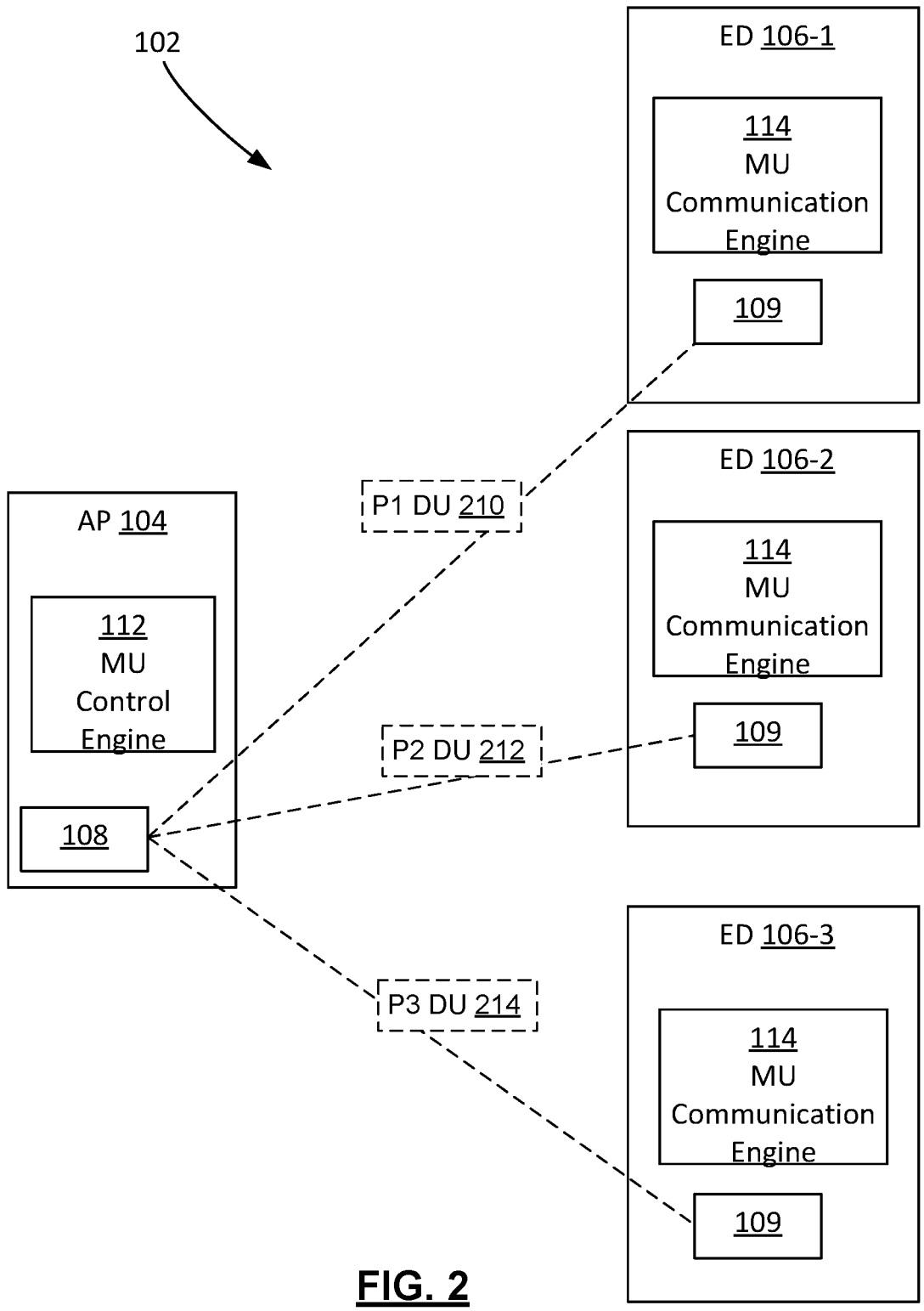
FIG. 2 is a block diagram of an example wireless arrangement that includes wireless devices, according to some implementations of the present disclosure.

FIG. 2 is a block diagram of an example wireless arrangement that includes multiple wireless devices, including an access point (AP) 104 and various electronic devices 106-1 to 106-3 that are configured to respectively transmit P1 DU 210, P2 DU 212 and P3 DU 214. Access point (AP) 104 is able to communicate with electronic devices 106-1 to 106-3 (referred to generically as electronic device 106 in the singular), in a wireless network 102. The AP 104 and the electronic devices 106-1 to 106-3 are examples of wireless devices that are able to perform wireless communications.

In some examples, the AP 104 and electronic devices 106-1 to 106-3 are able to communicate according respective generations of standards within the Institute of Electrical and Electronic Engineers (IEEE) 802.11 group of standards. In such examples, the wireless network 102 is referred to as a wireless local area network (WLAN), and the electronic devices 106-1 to 106-3 referred to as stations (STAs).

In other examples, the AP 104 and electronic devices 106-1 to 106-3 can communicate according to other standards, such as wireless standards including a Long-Term Evolution (LTE) standard as promulgated by the Third Generation Partnership Project (3GPP). In further examples, a wireless standard can include a Fifth Generation (5G) wireless standard. In a wireless network, an AP is referred to as a base station, such as an Evolved NodeB (eNB) for LTE.

Although just one AP 104 is shown in FIG. 1, it is noted that the wireless network 102 can include multiple APs that define respective coverage areas for communicating with electronic devices. Although just three EDs are shown in FIG. 1, it is noted that the wireless network 102 can include fewer than or more than three EDs.

Examples of the electronic devices 106-1 to 106-3 include any or some combination of the following: a desktop computer, a notebook computer, a tablet computer, a smartphone, an Internet-of-Things (IoT) device (e.g., a sensor, a camera, a thermostat, a household appliance, etc.), a wearable device (e.g., a smartwatch, smart eyeglasses, a head-mounted device, etc.), a vehicle, server computers, storage devices, communication nodes, and so forth.

The AP 104 includes at least one transceiver 108 that is able to communicate with respective transceivers 109 of the electronic devices 106-1 to 106-3. A "transceiver" includes a transmitter to transmit wireless signals, and a receiver to receive wireless signals. The transceiver can include an antenna and associated amplification and modulation/demodulation circuitry.

In some examples, communications in the wireless network 102 between the AP 104 and the electronic devices 106-1 to 106-3 can employ orthogonal frequency-division multiple access (OFDMA) channels. According to some wireless standards, such as the IEEE 802.11ax standard, an OFDMA channel is subdivided into multiple resource units (RUs). The different RUs of an OFDMA channel include subcarriers of different frequencies. Each RU is a subchannel of the OFDMA channel. Although reference is made to IEEE 802.11ax, it is noted that techniques or mechanisms according to some implementations of the present disclosure can be used in conjunction with other standards, including future generations of the IEEE 802.11 standards or different standards.

In examples in which OFDMA RUs are used, the AP 104 can schedule communications wherein different frequency segments (e.g., P80 BW, S80 BW and S160 BW, respectively) are used to communicate with different electronic devices (e.g., electronic device 106-1, electronic device 106-2, and electronic device 106-3, respectively).

The AP 104 includes a multiple user (MU) control engine 112 that is able to control the frequency segment allocation among electronic devices 106-1 to 106-3. Each electronic device 106-1 to 106-3 includes a respective MU communication engine 114 that is able to interact with the MU control engine 112 for performing MU communications with the AP 104 over the frequency segments allocated to the respective electronic device 106-1 to 106-3.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

In an example embodiment, each of the electronic devices 106-1, 106-2, 106-3 is configured to communicate with AP 104 using a respective protocol that conforms to a different generation of a standard from a group of standards. For example, electronic device 106-1 may be a High Efficiency (HE) enabled electronic device that is compliant with a first generation of a standard (e.g., IEEE 802.11ax), electronic device 106-2 may be an Extremely High Throughput (EHT) enabled electronic device that is compliant with a more advanced, second generation of standard (e.g., IEEE 802.11be), and electronic device 106-3 may be an Extremely High Throughput plus (EHT+) enabled electronic device that is compliant with a still further advanced, third generation, of a standard (e.g., IEEE 802.11 EHT+). In at least some examples, the electronic devices that are compliant with newer standard generations are also able to communicate with AP 104 using protocols that conform to earlier standard generations.

Example embodiments are directed to medium access control (MAC) methods and systems that enable concurrent uplink communications to AP 104 by multiple wireless devices 106-1 to 106-3 using respective frequency segments and respective communications protocols that may for example conform to different generations of a communication standard.

In example embodiments, the multiple wireless devices 106-1 to 106-3 each exchange communications with the AP 104 using the primary P80 BW to associate with the AP 104. Once associated with the AP 104, the wireless devices 106-1 to 106-3 can receive messages from the AP 104 advising the wireless devices 106-1 to 106-3 of the respective frequency segments with the available BW that have been allocated to each of them for communicating with AP 104.

Figure 3:
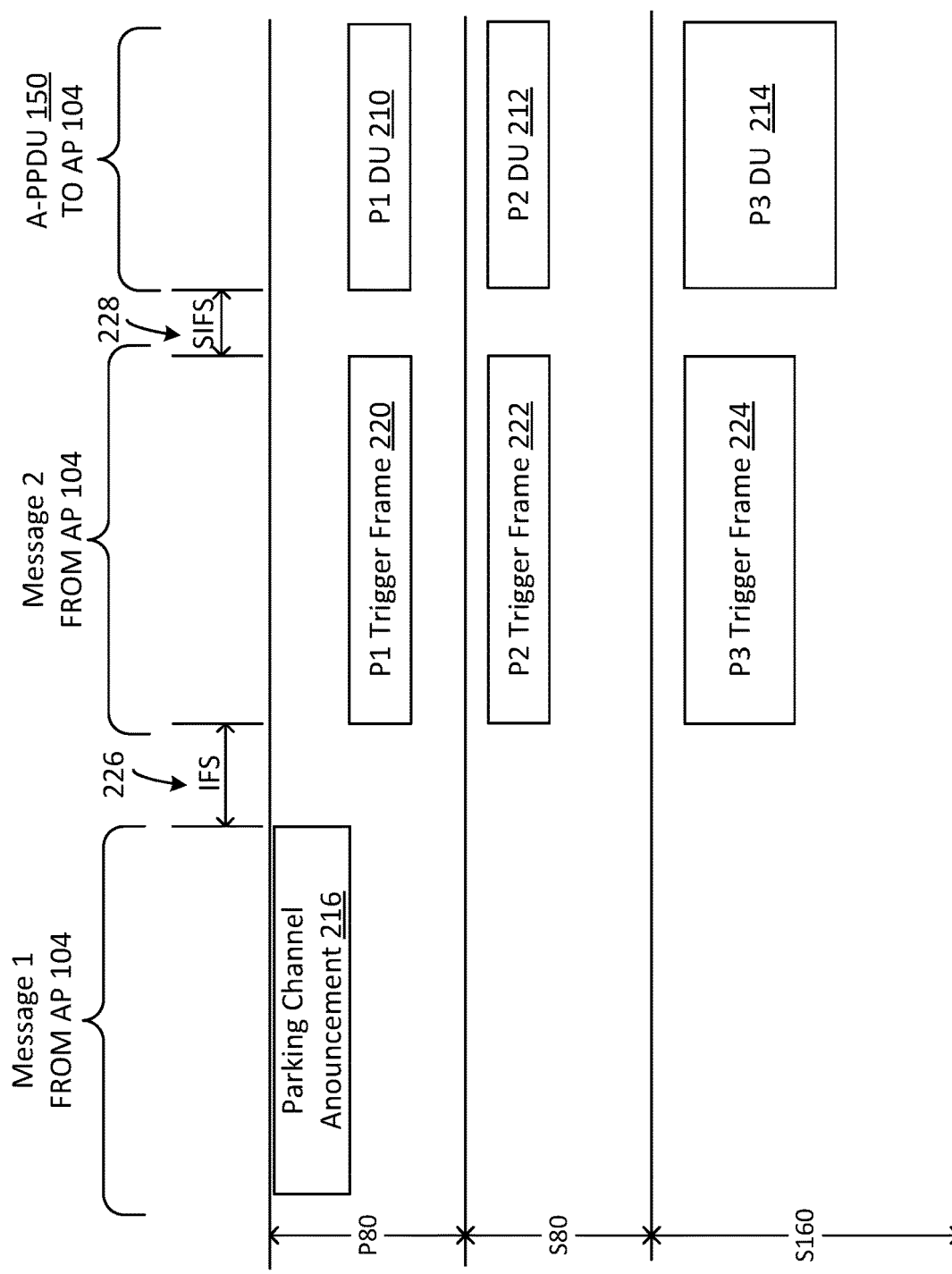
FIG. 3 illustrates messages exchanged among multiple wireless devices using different frequency segments, according to example embodiments.

In this regard, a first example embodiment of a MAC method for scheduling an UL communication from each of wireless devices 106-1 to 106-3 to AP 104 will now be described with reference to FIG. 3. In the example of FIG. 3, the UL communication is an aggregated data unit, A-PPDU 150 that includes concurrent data units P1 DU 210, P2 DU 212 and P3 DU 214 that are respectively transmitted in frequency segments P80, S80 and S160 by electronic device 106-1, 160-2 and 106-3. Prior to transmission of A-PPDU 150, the MU control engine 112 of AP 104 is configured to communicate with the respective MU communication engines 114 of the electronic devices 106-1, 106-2 and 106-3 to schedule the A-PPDU 150. In the first example embodiment of FIG. 3, scheduling of the A-PPDU 150 uses transmissions in two discrete time intervals by AP 104, identified as Message 1 from AP 104 and Message 2 from AP 104.

Prior to the Message 1 time slot, the multiple wireless devices 106-1 to 106-3 have each associated with the AP 104 using the primary P80 BW, and are monitoring an announcement channel in the P80 BW for scheduling instructions from AP 104. In some example embodiments, the AP 104 is made aware of the respective capabilities of the electronic devices 106-1 to 106-3 when it associates with the respective devices. For example, The AP 104 may become informed during an association stage that first electronic device 106-1 is IEEE 802.11ax compliant (e.g. HE enabled), but not compliant with later generations of the IEEE 802.11 standards group, second electronic device 106-2 is IEEE 802.11be compliant (e.g., EHT enabled), but not compliant with later generations of the IEEE 802.11 standards group, and that third electronic device 106-3 is IEEE 802.11 EHT+ compliant (e.g., EHT+ enabled).

Figure 4:
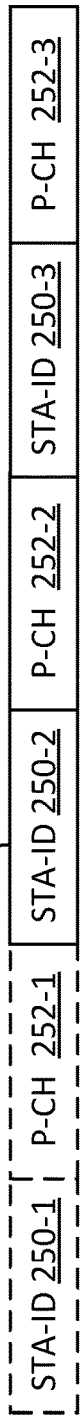
FIG. 4 shows an example frame format according to example embodiments.

In the illustrated embodiment of FIG. 3, the MU control engine 112 of AP 104 sends a parking channel announcement message 216 over the announcement channel in the P80 BW. FIG. 4 illustrates a possible frame format for parking channel announcement message 216. Parking channel message 216 may for example have a bandwidth of 20 MHz, although other bandwidths can also be used, and includes a plurality of electronic device ID fields that each encode a respective electronic device identifier (e.g., STA-ID 250-1 that identifies electronic device 106-1, STA-ID 250-2 that identifies electronic device 106-2, and STA-ID 250-3 that identifies electronic device 106-3), and a parking channel field that indicates a respective parking channel bandwidth within one of the P80, S80 and S160 bandwidths for each of the electronic devices 106-1 to 106-3 (e.g., P-CH 252-1 indicates a parking channel within the P80 BW for electronic device 106-1, P-CH 252-2 indicates a parking channel within the S80 BW for electronic device 106-2, and P-CH 252-3 indicates a parking channel within the S160 BW for electronic device 106-3. In some example embodiments, the fields indicating STA-ID 250-1 and channel P-CH 252-1 for electronic device 106-1 may be omitted as electronic device 106-1 may ignore the parking announcement message as it will be preconfigured to monitor for a trigger message in the P80 BW.

The MU communication engine of 114 of each of the electronic devices 106-1 to 106-3 is configured to decode the parking channel announcement message 216 sent by AP 204 in the announcement channel in the P80 BW, and determine its respective parking channel allocation. Each electronic device 106-1 to 106-3 then tunes its respective transceiver 109 to its respective parking channel. For example, a local oscillator of transceiver 109 of electronic device 106-1 may be tuned to a center frequency corresponding to parking channel P-CH 252-1 in the P80 BW, a local oscillator of transceiver 109 of electronic device 106-2 may be tuned to a center frequency corresponding to parking channel P-CH 252-2 in the S80 BW, and a local oscillator of transceiver 109 of electronic device 106-3 may be tuned to a center frequency corresponding to parking channel P-CH 252-3 in the S160 BW.

The AP 104 is configured to send out respective concurrent trigger frame messages during a Message 2 time slot following the parking channel announcement message 216. In particular, a first trigger frame message, P1 trigger frame 220, is transmitted in parking channel P-CH 252-1 in the P80 BW for the first electronic device 106-1, a second trigger frame message, P2 trigger frame 222, is transmitted in parking channel P-CH 252-2 in the S80 BW for the second electronic device 106-2, and a third trigger frame message, P3 trigger frame 224, is transmitted in parking channel P-CH 252-3 in the S160 BW for the third electronic device 106-3. In example embodiments, P1 trigger frame 220 and P2 trigger frame 222 may each have a 20 MHz BW, and P3 trigger frame 224 may have a 40 MHz BW.

In example embodiments, in order to provide sufficient time for the transceivers 109 of the electronic devices 106-1 to 106-3 to tune to their respectively allocated parking channels, the AP 104 waits for a defines duration (e.g., interframe space (IFS) 226) after completing transmission of the parking channel announcement 216 before commencing concurrent transmission of the P1, P2 and P3 trigger frames 220, 222, and 224. In FIG. 3, IFS 226 is illustrated between Message 1 time slot and message 2 time slot. In at least some example embodiments, IFS 226 has a longer duration than a standard short interframe space (SIFS) that would normally be allocated for an electronic device to receive an incoming frame and respond with a response frame.

Figure 5:
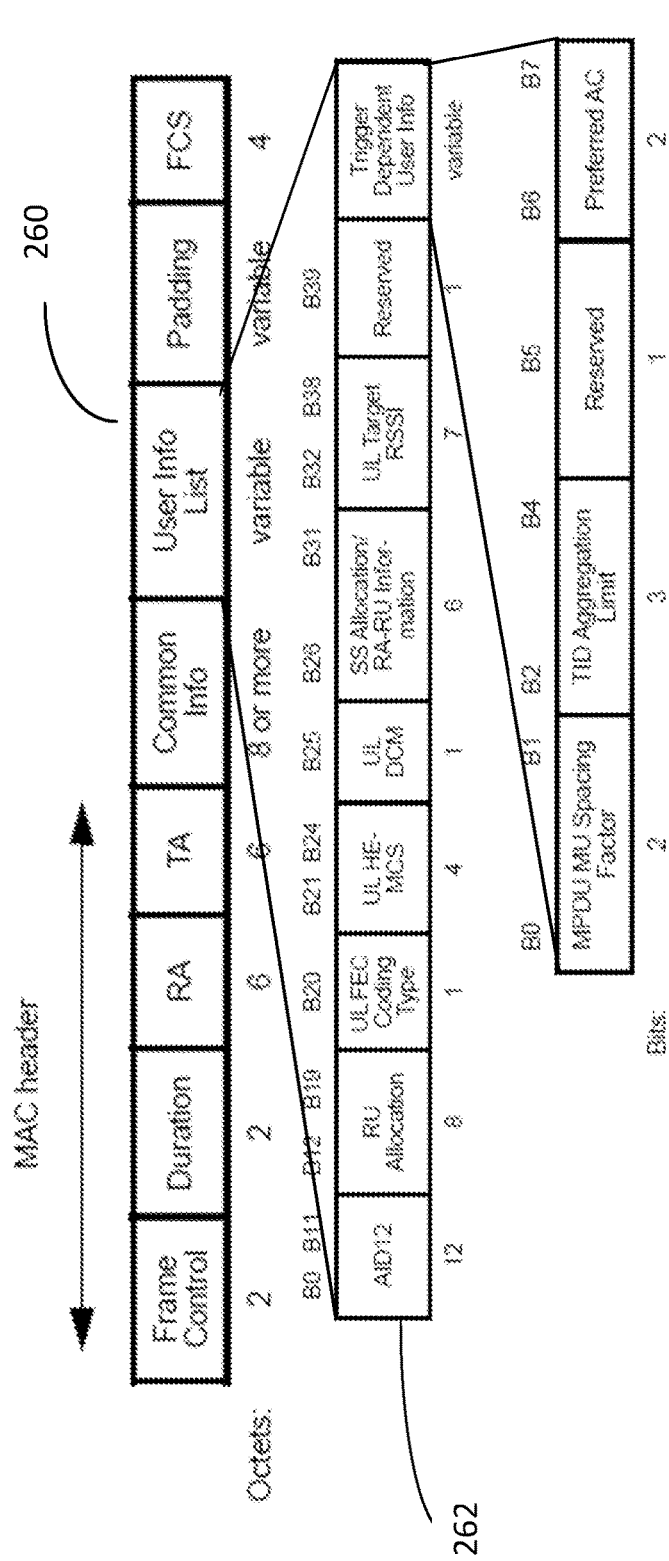
FIG. 5 shows an example frame format according to example embodiments.

In an example embodiment, each of the trigger frames has a respective frame format that has been selected by MU control engine 112 based on the capabilities of the intended electronic device 106-1 to 106-3. For example, in the case where first electronic device 106-1 is IEEE 802.11ax compliant (e.g. HE enabled), but not compliant with later generations of the IEEE 802.11 standards group, then P1 trigger frame 220 uses the IEEE802.11ax trigger frame format. An example of an IEEE802.11ax trigger frame format 260 is shown in FIG. 5. In the case where second electronic device 106-2 is IEEE 802.11be compliant (e.g., EHT enabled), but not compliant with later generations of the IEEE 802.11 standards group, then P2 trigger frame 222 uses the IEEE802.11be trigger frame format. In the case where third electronic device 106-3 is IEEE 802.11 EHT+ compliant (e.g., EHT+ enabled), then P3 trigger frame 224 uses the corresponding EHT+ trigger frame format.

In example embodiments, each of the trigger frames 220, 222, 224 includes a respective control information element 262 (see FIG. 5 for example) that is addressed to the respective electronic device 106-1, 106-2 or 106-3. Among other things, the control information element 262 includes an identifier (e.g., AID) for the intended electronic device 106-1, 106-2 or 106-3, as well as UL information for the electronic device to use when communicating with the AP 104, including information about RU allocation, UL forward error correction (FEC) encoding, modulation and coding scheme (MCS), and spatial stream (SS) allocation.

In response to receiving their respective trigger frames 220, 222, 224, each of the respective electronic devices 106-1, 106-2 or 106-3 encodes and transmits to AP 104 a respective data unit P1 DU 210, P2 DY 212 and P3 DU 214, based on the allocation information included in the respective trigger frames 220, 222, 224. For example, as indicated in FIG. 3, electronic device 106-1 transmits data unit P1 DU 210 in the P80 BW, electronic device 106-2 transmits data unit P2 DU 212 in the S80 BW, and electronic device 106-3 transmits data unit P3 DU 214 in the S160 BW. The transmission by electronic devices 106-1, 106-2, 106-3 is coordinated by their respective MU communication engines 114 such that each of the P1 DU 210, P2 DU 212, and P3 DU 214 are transmitted in time alignment with each other to collectively form A-PPDU 150 for AP 104. For example, trigger frames 220, 222, 224 may each have the same duration, and electronic devices 106-1, 106-2, 106-3 are each configured to respectively transmit P1 DU 210, P2 DU 212, and P3 DU 214 at a predefined time duration (e.g., SIFS 228) after receiving trigger frames 220, 222, 224. In example embodiments, the duration of SIFS 228 is less than that of IFS 226.

Figure 6:
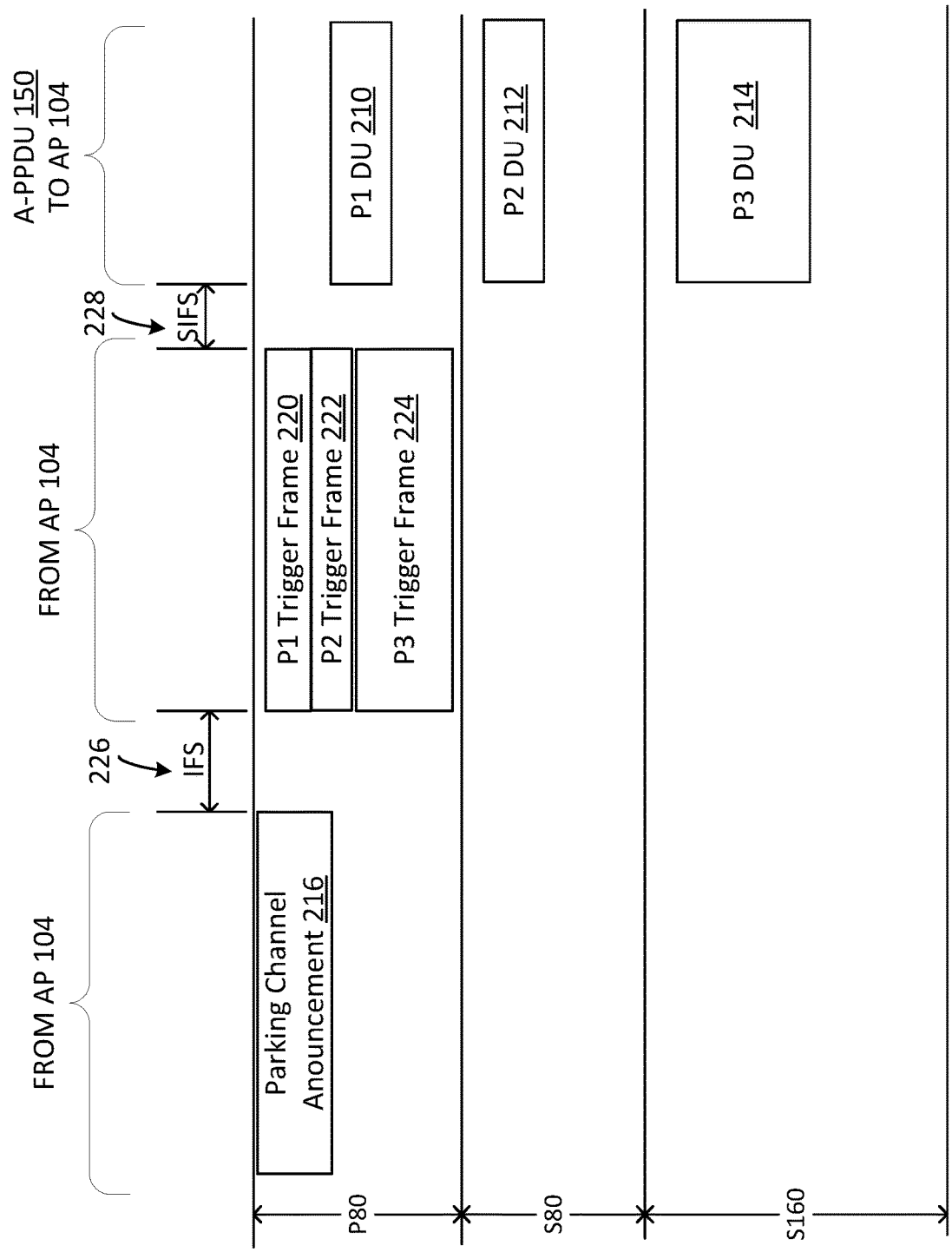
FIG. 6 illustrates messages exchanged among multiple wireless devices using different frequency segments, according to example embodiments.

FIG. 6 illustrates another example embodiment that is identical to the embodiment described above in respect of FIGS. 3, 4 and 5, except that in the embodiment of FIG. 6, the AP 104 transmits all three of the trigger frames 220, 222, 224 within the P80 bandwidth. For example, the first trigger message, P1 trigger frame 220, is transmitted in a primary 20 MHz band of the P80 BW for the first electronic device 106-1, second trigger message, P2 trigger frame 222, is transmitted in a secondary 20 MHz band of the P80 BW for the second electronic device 106-2, and third trigger message, P3 trigger frame 224, is transmitted in the secondary 40 MHz band of the P80 BW for the third electronic device 106-3. These respective parking channel allocations are specified by AP 104 in parking channel announcement message 216. Each of the trigger frames 220, 220 224 may specify the respective uplink signaling parameters within the 320 MHz bandwidth to use for each of the data units DUs 210, 212, 214. For example, these signaling parameters could include one or more of RU allocation, MCS, coding, and SS allocation, specified within the control information element 262 of the respective trigger frames.

Figure 7:
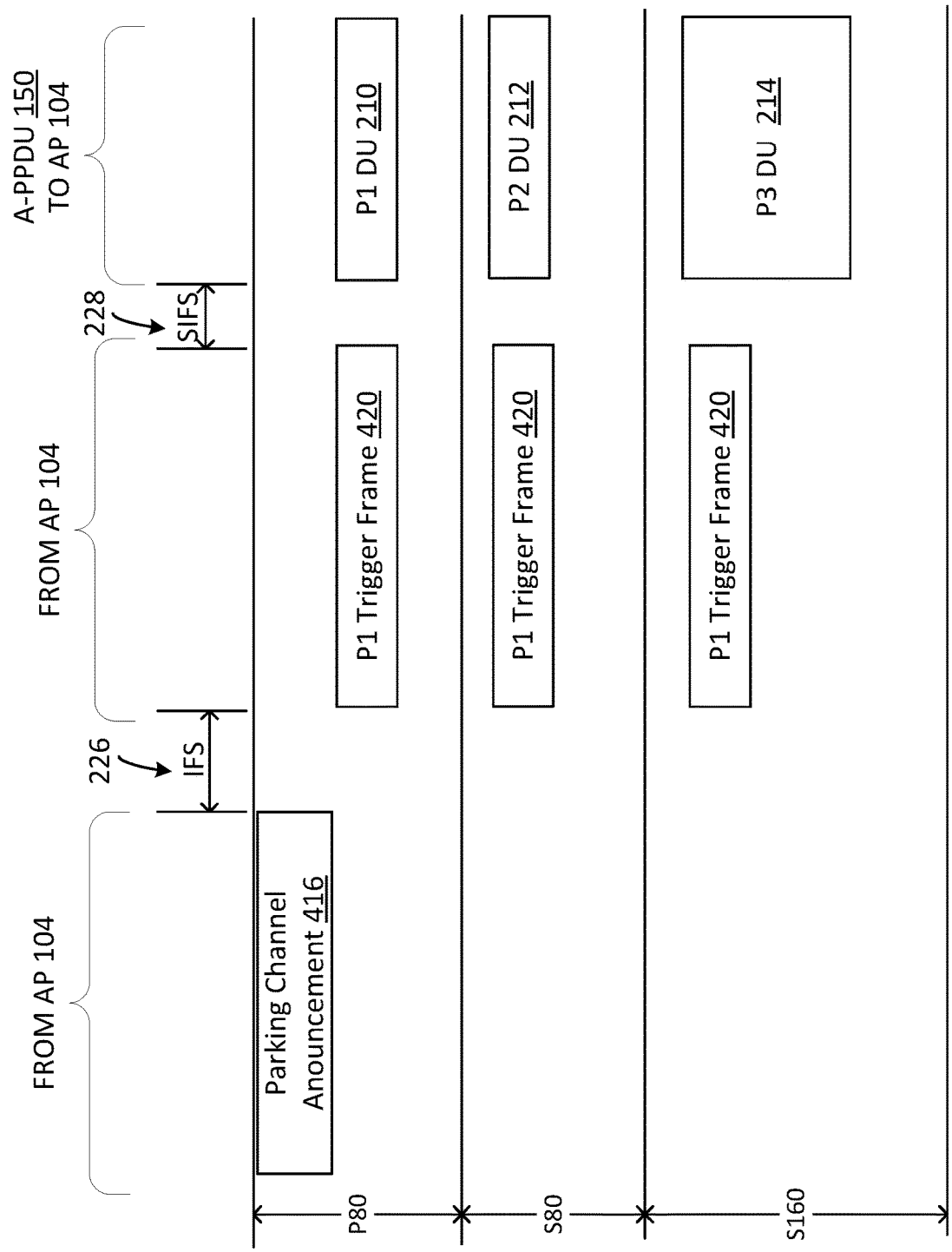
FIG. 7 illustrates messages exchanged among multiple wireless devices using different frequency segments, according to example embodiments.
Figure 8:
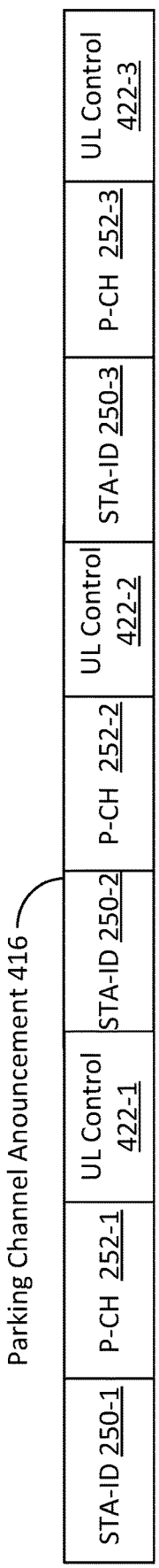
FIG. 8 shows an example frame format according to example embodiments.

FIG. 7 illustrates another example embodiment that is identical to the embodiment described above in respect of FIGS. 3, 4 and 5, except as described in the following paragraphs. In the embodiment of FIG. 7, identical trigger frames 420 are transmitted by AP 104 in respective parking channel bandwidths to the respective wireless devices 106-1, 106-2 and 106-3. The trigger frames 420 all use the same frame format, namely that supported by the oldest generation standard. For example, each of the trigger frames 420 could have a basic IEEE 802.11ax trigger frame format 260 as shown in FIG. 5. The trigger frame 420 generated by MU control engine 112 of AP 104 include a respective information control element 262 for each of the respective electronic devices 106-1, 106-2, 106-3 that specifies at least some of the UL information for each of the respective devices. However, it will be noted that in some examples, a prior generation trigger frame may not be able to include all the UL information required by a later generation compliant UL communication. Accordingly, unique UL information may be included for respective electronic devices 106-1, 106-2, 106-3 in the parking channel announcement message 416. Parking channel announcement 416 is similar to parking channel announcement message 216, except that it may include, with reference to FIG. 8, one or more device-specific UL control information elements 422-1, 422-2 and 422-3 that specify information that can't be specified in the trigger frames 420. For example, UL control information elements 422-2 and 422-3 may respectively include fields that indicate the RU/MRU allocation and SS allocations for electronic devices 106-2 and 106-3. In some examples, UL control information element 422-1 may be omitted from parking channel announcement message 416 as the relevant information for the first electronic device 106-1 can be included in trigger frame 420.

Figure 9:
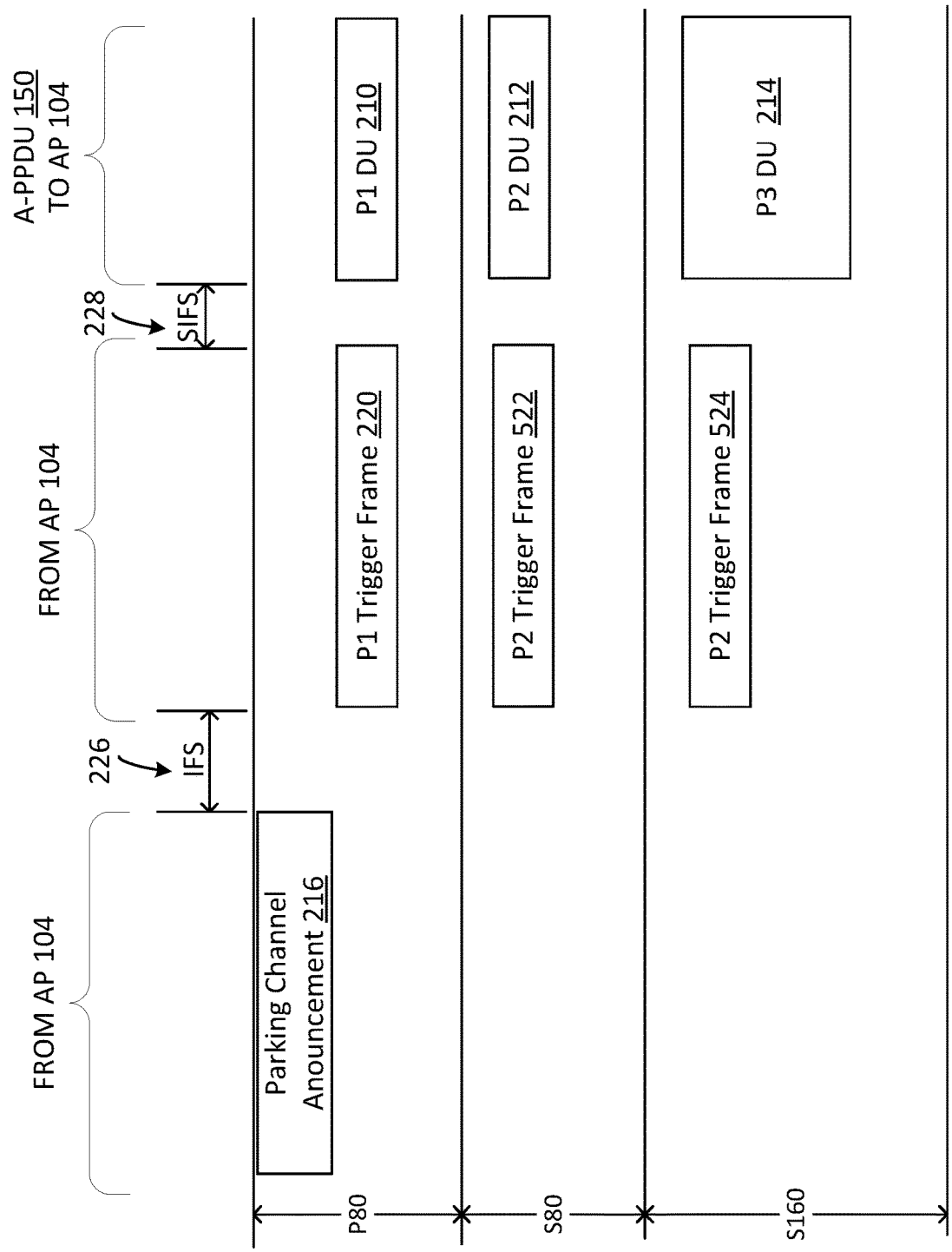
FIG. 9 illustrates messages exchanged among multiple wireless devices using different frequency segments, according to example embodiments.
Figure 10:
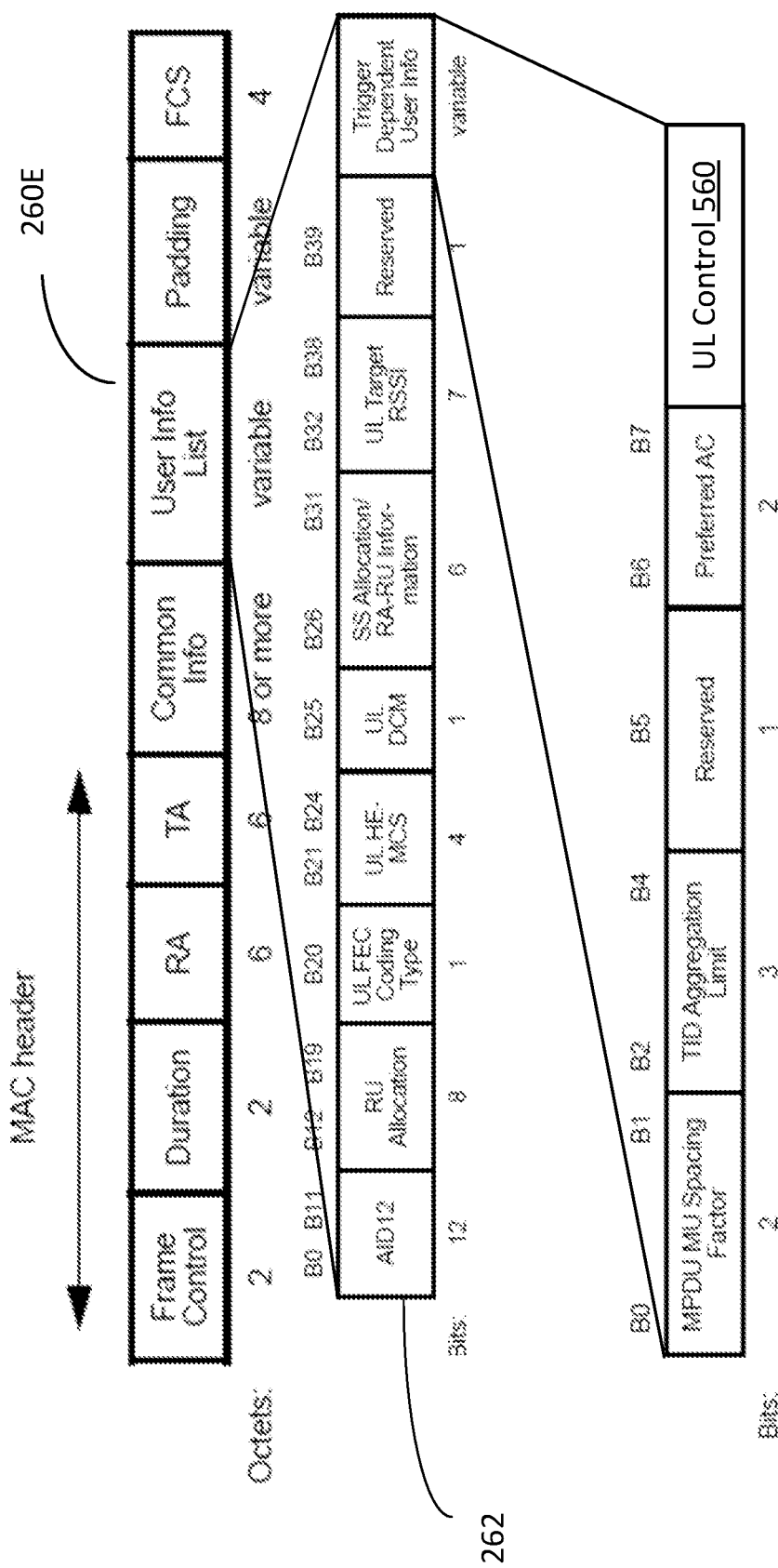
FIG. 10 shows an example frame format according to example embodiments.

FIG. 9 illustrates another example embodiment that is identical to the embodiment described above in respect of FIGS. 7 and 8, except as described in the following paragraphs. In the embodiment of FIG. 9, the parking channel announcement message 216 is the same as described above in respect of the embodiment of FIGS. 3 to 5, and does not include UL control information. Rather, in the embodiment of FIG. 9, the format of the trigger frames 522 and 524 sent for electronic devices 106-2 and 106-3 is configured to enable the UL control information required for electronic devices 106-2 and 106-3 to be included in trigger frames 522 and 524. In this regard, in example embodiments, trigger frames 522 and 524, which may have the same format and in some examples may be identical, are modified versions of the IEEE 801.11ax frame format 260 of FIG. 5. In this regard, FIG. 10 shows an example of an extended IEEE 801.11ax frame format 260E that can be used for trigger frames 522 and 524 in example embodiments. The extended frame format 260E includes, within device specific control information field 262, a UL control information element 560 that can include respective fields to specify device specific uplink information such as fields that indicate the RU/MRU allocation and SS allocation. UL control information for electronic device 106-2 can be included in the extended P2 trigger frame 522, UL control information for electronic device 106-3 can be included in the extended P2 trigger frame 524, and UL control information for the first electronic device 106-1 included in the basic P1 trigger frame 220.

In example embodiments, P1 trigger frame 220, P2 trigger frame 522 and P2 trigger frame 524 could all be duplicates of the same trigger frame, the device specific information included in respective device specific information control elements 262. In some examples, a designated bit with the device specific information control element 262 may be used to indicate the presence of UL control information element 560. For example reserved bit (B39) could be used to indicate the presence of UL control information element 560. A receiving electronic device 106-1 that is compliant with an earlier standard and that does not require the additional UL control information element 560 could ignore the such information and treat it as part of the padding field that follows device specific control information element field 262.

Figure 11:
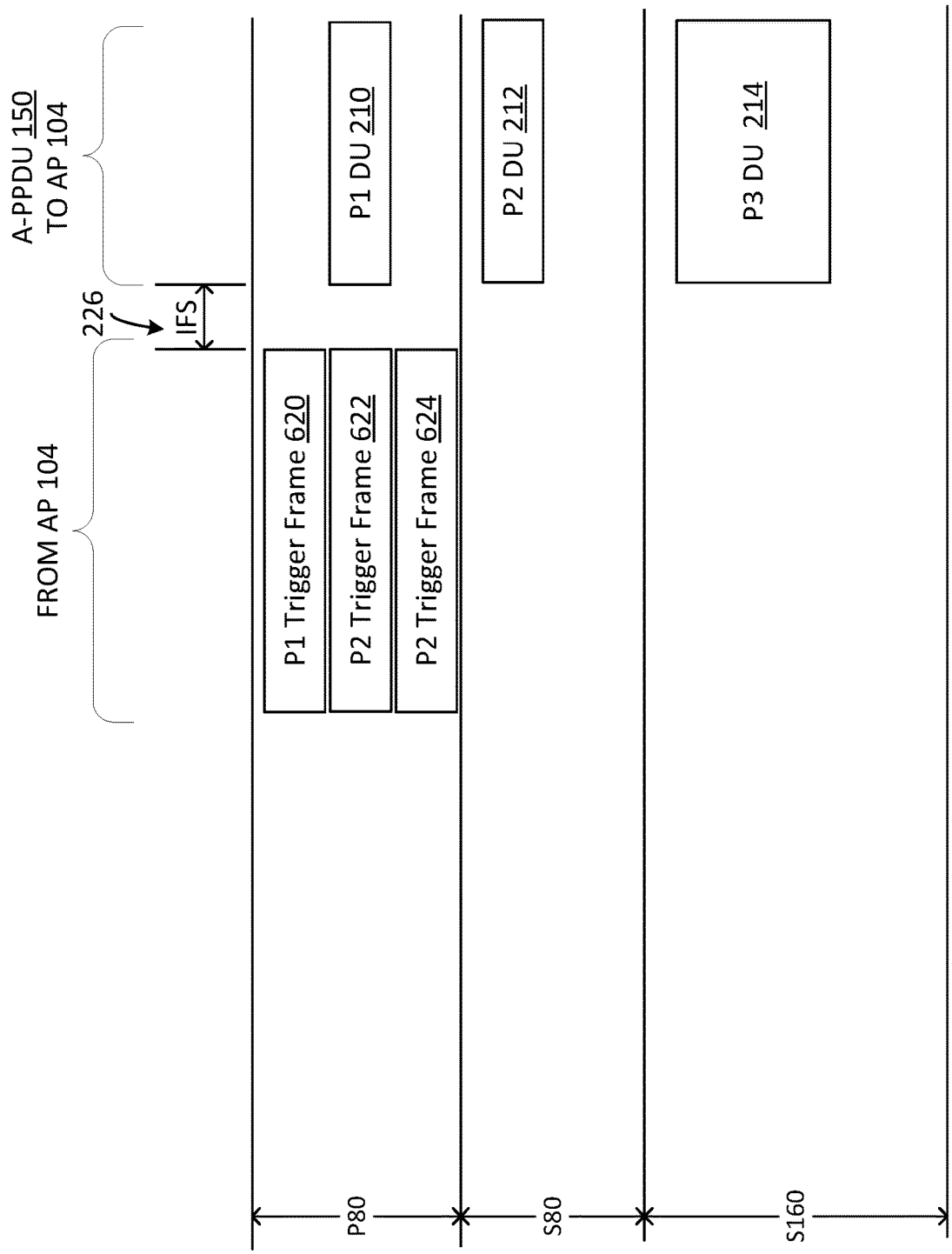
FIG. 11 illustrates messages exchanged among multiple wireless devices using different frequency segments, according to example embodiments.

FIG. 11 illustrates yet a further example embodiment that differs from the above embodiments as follows. In the example of FIG. 11, the AP 104 does not transmit a parking announcement message prior to sending out trigger frames 620, 622, 624. In an example embodiments, the P1 trigger frame 620 has the basic trigger frame format 260 shown in FIG. 5, and P2 trigger frame 622 and P2 trigger frame 624 each have an extended frame format 260E shown in FIG. 6, except for the following difference. Because the embodiment of FIG. 11 does not include a parking announcement message, the device specific UL information (e.g., UL channel frequency) for electronic devices 106-2 and 106-3 can be included in the device specific control information element 262 of extended trigger frames 622, 624. For example, such information as UL channel frequency could be included in an additional field provided in the UL control information element 560 as well as the device specific control information such as RU/MRU Allocation and SS Allocation.

As illustrated in FIG. 11, the trigger frames 620, 622, 624 are all sent out in respective frequency bands of the P80 BW (which may for example be 20 MHz frequency bands). In response to receiving their respective trigger frames 620, 622, 624, each of the respective electronic devices 106-1, 106-2 or 106-3 tunes to their allocated UL frequency and transmit to AP 104 a respective data unit P1 DU 210, P2 DY 212 and P3 DU 214, based on the allocation information included in the respective trigger frames 620, 622, 624. The transmission by electronic devices 106-1, 106-2, 106-3 is coordinated by their respective MU communication engines 114 such that each of the P1 DU 210, P2 DU 212, and P3 DU 214 are transmitted in time alignment with each other to collectively form A-PPDU 150 for AP 104. For example, trigger frames 620, 622, 624 may each have the same duration, and electronic devices 106-1, 106-2, 106-3 are each configured to respectively transmit P1 DU 210, P2 DU 212, and P3 DU 214 at a predefined time duration (e.g., IFS 226) after receiving trigger frames 220, 222, 224. In example embodiments, as noted above the duration of SIFS 226 is greater than a standard SIFS 226. This can provide electronic devices 106-1 to 106-3 time to tune to the correct uplink frequency.

Figure 12:
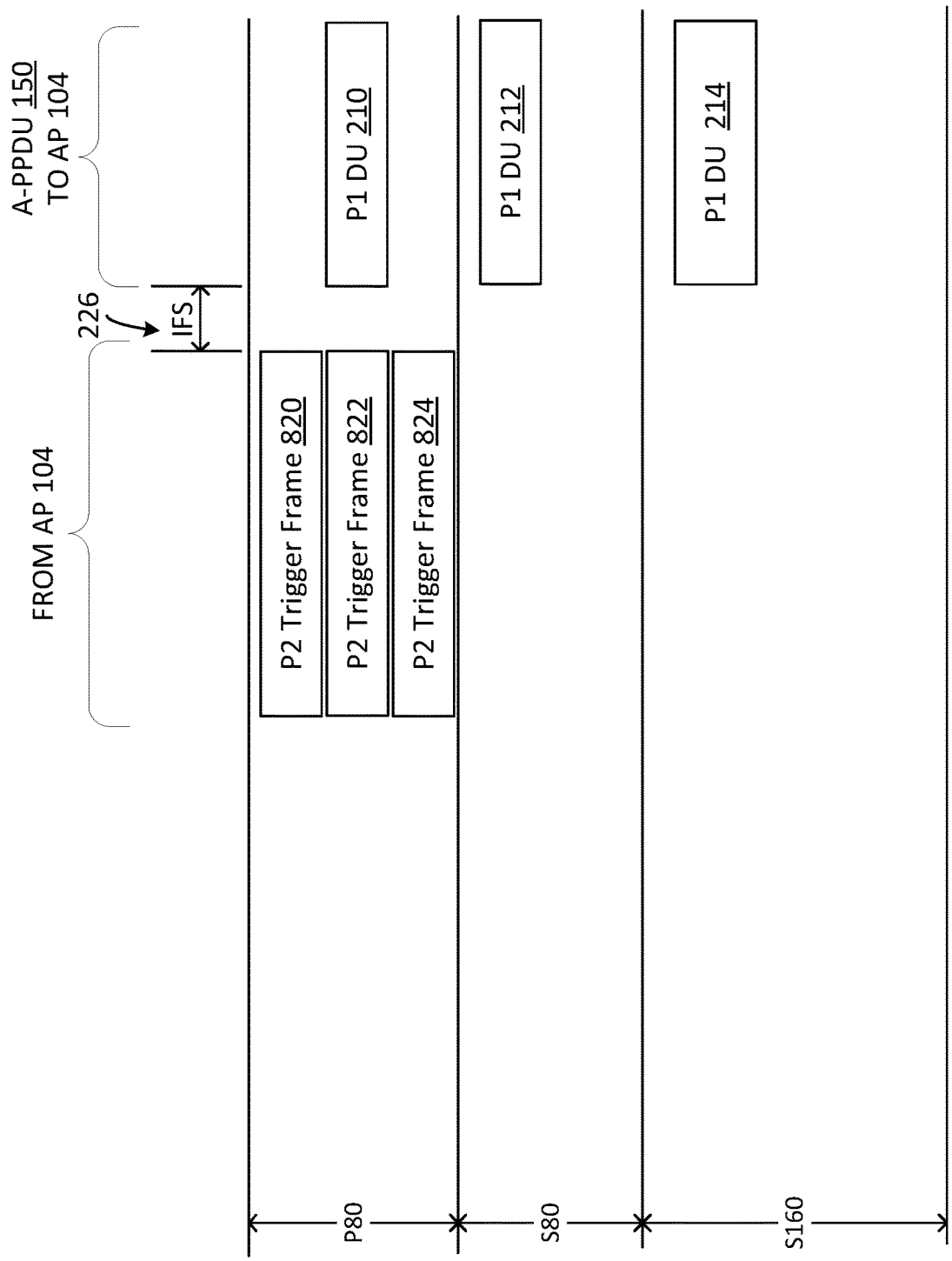
FIG. 12 illustrates messages exchanged among multiple wireless devices using different frequency segments, according to example embodiments.

FIG. 12 shows a further example embodiment which illustrates the case where all the electronic devices 106-1 to 106-3 conform to the same generation of a standard—for example all three electronic devices 106-1 to 106-3 are enabled to process a trigger frame 820, 822, 824 having a common format "P2". In such an example, all the electronic device 106-1 to 106-3 that are associated with AP 104 are homo-amendment based. The parking channel announcement message is not required, and same trigger frame format can be used for all electronic devices, provided that a sufficient interframe spacing IFS 226 is provided for between trigger frames 820 to 824 and A-PPDU 150 to allow the respective electronic devices 150-1 to 150-2 to tune to their allocated frequencies. Multiple trigger frame formats, as shown in FIG. 11 for example, could also be used in the example of FIG. 12.

Figure 13:
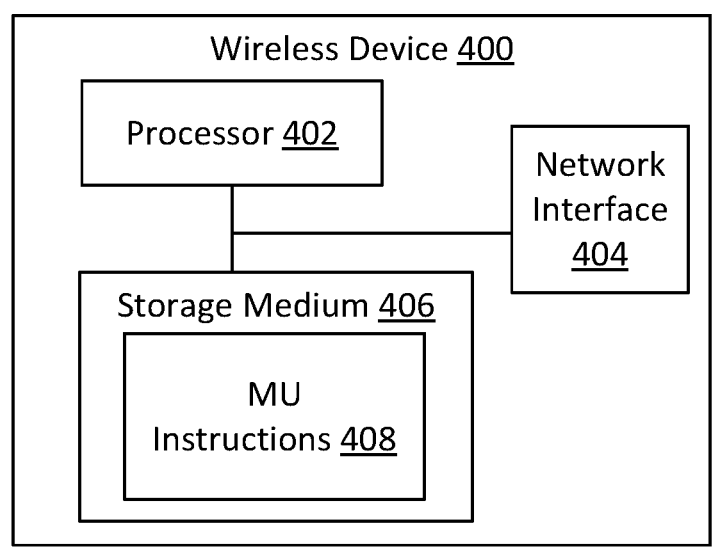
FIG. 13 is a block diagram of a processing unit that may be used to implement a wireless device according to some implementations of the present disclosure.

FIG. 13 is a block diagram of a wireless device 400, which can be the AP 104 of FIG. 2 or an electronic device 106 of FIG. 2. The wireless device 400 includes one or more hardware processors 402. A hardware processor can include a microprocessor, a core of a multi-core microprocessor, a microcontroller, a programmable integrated circuit, a programmable gate array, a digital signal processor, or another hardware processing circuit.

The wireless device 400 further includes a network interface 404 to communicate over a wireless network (e.g., 102 in FIG. 2). The network interface 404 includes transceivers and network protocol layers to allow for communications over the wireless network. In the case of an AP 104, network interface 404 includes transceivers 108, and in the case of an electronic device 106 network interface 404 includes transceivers 109.

The wireless device 400 also includes a non-transitory machine-readable or computer-readable storage medium 406 that stores machine-readable instructions executable on the one or more hardware processors 402 to perform respective tasks.

The machine-readable instructions include MU related instructions 408, which upon execution on the one or more hardware processors 402 can perform the tasks of the MU control engine 112 of FIG. 2, or the tasks of the MU communication engine 114 of FIG. 2.

A storage medium (e.g., 406 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A first wireless device comprising:
    a network interface to communicate using a frequency bandwidth with multiple wireless devices, wherein the frequency bandwidth comprises a primary band, a first secondary band and a second secondary band, each of which correspond to different spectrum regions of the frequency bandwidth; and
    at least one processor operatively connected to the network interface and configured to concurrently transmit a first, second and third trigger frame messages for each of the multiple wireless devices within respective trigger frame frequency bands of the frequency bandwidth to trigger respective first, second and third devices of the multiple wireless devices to concurrently transmit respective data units to the first wireless device within respective first, second and third frequency segments of the frequency bandwidth that are respectively within the primary band, first secondary band and second secondary band,
    wherein the processor is configured to, prior to transmitting the trigger frame messages, transmit a channel announcement message for the multiple wireless devices, the channel announcement indicating that the first, second and third trigger frame messages have respective trigger frame frequency bands that are all within the primary band.

2. The first wireless device of claim 1, wherein the frequency bandwidth has a bandwidth of 320 MHz, the primary band is 80 MHz, the first secondary band is 80 MHz, and the second secondary band is 160 MHz band.

3. The first wireless device of claim 1 wherein the processor is configured to include an inter-frame spacing between the parking channel announcement message and the concurrently transmitted trigger frame messages that is of sufficient duration to enable the first, second and third devices to tune to the respective trigger frame frequency bands of the first second and third trigger frame messages.

4. The first wireless device of claim 1 wherein the first, second and third trigger frame messages each have a different format conforming to a different generation of a wireless standard.

5. The first wireless device of claim 1 wherein the first, second and third trigger frame messages each have an identical format.

6. The first wireless device of any one of claim 1 wherein the second and third trigger frame messages each have a same format that is different to a format of the first trigger frame message.

7. The first wireless device of claim 1 wherein an inter-frame spacing is specified for inclusion between an end of the concurrently transmitted trigger frame messages and a start of the concurrently transmitted data units that is of sufficient duration to enable the multiple wireless devices to tune to the respective frequency segments of the frequency bandwidth.

8. The first wireless device of claim 1 wherein the data units are part of an aggregated physical layer protocol data unit and the frequency bandwidth is within a wireless local area network.

9. A method of a first wireless device comprising:
    transmitting a channel announcement message for multiple wireless devices, the channel announcement indicating that a first, second and third trigger frame messages have respective trigger frame frequency bands of a frequency bandwidth, the frequency bandwidth comprising a primary band, a first secondary band and a second secondary band, each of which corresponding to different spectrum regions of the frequency bandwidth, the channel announcement indicating the first, second and third trigger frame messages having respective trigger frame frequency bands that are all within the primary band; and
    concurrently transmitting the first, second and third trigger frame messages for the multiple wireless devices within the respective trigger frame frequency bands of the frequency bandwidth to trigger respective first, second and third devices of the multiple wireless devices to concurrently transmit respective data units to the first wireless devices within respective first, second and third frequency segments of the frequency bandwidth that are respectively within the primary band, first secondary band and second secondary band.

10. The method of claim 9, wherein the frequency bandwidth has a bandwidth of 320 MHz, the primary band is 80 MHz, the first secondary band is 80 MHz, and the second secondary band is 160 MHz band.

11. The method of claim 9 comprising including an inter-frame spacing between the parking channel announcement message and the concurrently transmitted trigger frame messages of sufficient duration to enable the first, second and third devices to tune to the respective trigger frame frequency bands of the first second and third trigger frame messages; and
    (a) wherein the first, second and third trigger frame messages each have a different format conforming to a different generation of a wireless standard; or
    (b) wherein the first, second and third trigger frame messages each have an identical format; or
    (c) wherein the second and third trigger frame messages each have a same format that is different to a format of the first trigger frame message; and wherein the data units are part of an aggregated physical layer protocol data unit and the frequency bandwidth is within a wireless local area network.

\* \* \* \* \*